(12) United States Patent
Jeong

(10) Patent No.: US 10,706,219 B2
(45) Date of Patent: Jul. 7, 2020

(54) ELECTRONIC DEVICE AND CONTROL METHOD THEREOF

(71) Applicant: Samsung Electronics Co., Ltd., Suwon-si, Gyeonggi-do (KR)

(72) Inventor: Hee-yeon Jeong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 64 days.

(21) Appl. No.: 15/646,211

(22) Filed: Jul. 11, 2017

(65) Prior Publication Data

US 2018/0011826 A1 Jan. 11, 2018

(30) Foreign Application Priority Data

Jul. 11, 2016 (KR) .......................... 10-2016-0087483

(51) Int. Cl.
*G06F 17/24* (2006.01)
*G06F 40/166* (2020.01)
*G06F 3/0488* (2013.01)
*G06F 3/0482* (2013.01)

(52) U.S. Cl.
CPC ........ *G06F 40/166* (2020.01); *G06F 3/04883* (2013.01); *G06F 3/0482* (2013.01)

(58) Field of Classification Search
CPC ..... G06F 3/0482; G06F 3/04883; G06F 17/24
See application file for complete search history.

(56) References Cited

U.S. PATENT DOCUMENTS

| 5,529,501 | A | 6/1996 | Maruyama |
| 9,004,792 | B2 | 4/2015 | Wisler et al. |
| 9,052,755 | B2 | 6/2015 | Zhen et al. |
| 9,134,849 | B2 | 9/2015 | Chang et al. |
| 9,207,858 | B2 | 12/2015 | Antonyuk et al. |
| 2006/0210163 | A1 | 9/2006 | Garside et al. |
| 2014/0075302 | A1* | 3/2014 | Akashi .................. G06K 9/222 715/268 |
| 2014/0079317 | A1 | 3/2014 | Hirabayashi |

FOREIGN PATENT DOCUMENTS

| JP | H08-96155 A | 4/1996 |
| JP | 2014-59808 A | 4/2014 |
| KR | 10-1203321 B1 | 11/2012 |

OTHER PUBLICATIONS

Adobe, Adobe Photoshop Elements 12 Image Editing Basics, published: Dec. 31, 2013, AdobePress.com, http://www.adobepress.com/articles/article.asp?p=2164504&seqNum=8 (Year: 2013).*

(Continued)

*Primary Examiner* — Seth A Silverman

(57) ABSTRACT

An electronic device is provided, which includes a display configured to receive a handwriting by touch and display the received handwriting, and a processor configured to display a handwriting input by at least two handwriting tools selected among different handwriting tools provided through the display by dividing layers of the handwriting according to a handwriting tool, and in response to a selection of a layer among the layers divided according to the handwriting tool, control to edit only a handwriting input by a handwriting tool corresponding to the selected layer.

18 Claims, 10 Drawing Sheets

(56) References Cited

OTHER PUBLICATIONS

Purcell, "How to Master S Note on the Samsung Galaxy Note 4", published: Apr. 19, 2015, gottabemobile.com, https://www.gottabemobile.com/how-to-master-s-note-on-the-samsung-galaxy-note-4/ (Year: 2015).*

Your Mobile Life, "The Write Stuff: S Note on the GALAXY Note 8.0 Explained", published: Jul. 1, 2013, gizmodo.co.uk, herein referred to as YML, https://www.gizmodo.co.uk/2013/07/the-write-stuff-s-note-on-the-galaxy-note-8-0-explained/ (Year: 2013).*

Adobe, "Photoshop Help/Layer basics", published: Apr. 21, 2014, herein referred to as Adobe2, https://helpx.adobe.com/photoshop/using/layer-basics.html, https://web.archive.org/web/20140421131448/https://helpx.adobe.com/photoshop/using/layer-basics.html (Year: 2014).*

\* cited by examiner

ELECTRONIC DEVICE AND CONTROL METHOD THEREOF

CROSS-REFERENCE TO RELATED APPLICATION(S) AND CLAIM OF PRIORITY

The present application is related to and claims priority under 35 U.S.C. § 119(a) from Korean Patent Application No. 10-2016-0087483, filed on Jul. 11, 2016 in the Korean Intellectual Property Office, the disclosure of which is incorporated herein by reference in its entirety.

TECHNICAL FIELD

Aspects of the exemplary embodiments relate to an electronic device and a controlling method thereof, and more particularly, to an electronic device which performs inputting handwriting by touch and a controlling method thereof.

BACKGROUND

As a portable terminal such as a tablet PC and a smart phone have been distributed, a user's needs for inputting and outputting information intuitively through a handwriting input and the like has been expanded. According to the above, a portable terminal has departed from using a traditional UI method, for example, a separate composition such as a key board, a key pad, a mouse and the like for various user input, and evolved to use an intuitive UI method using a finger, a touch pen and the like to input information.

Especially, in addition to a simple handwriting that inputs information, a handwriting inputting technique has been developed to draw a picture on a touch screen. According to the above, various types of handwriting tools such as a pencil, a brush, a highlighter and the like are provided, and a user may select one of the provided handwriting tools and input a handwriting by the tool.

However, in a conventional art, after a handwriting is input by a plurality of handwriting tools, if it is required to modify the input handwriting, there is a limitation of modifying the handwriting by each kind of a handwriting tool. For example, when it is required to delete a handwriting input by one handwriting tool in an area where handwritings input by two handwriting tools are mixed, by using an eraser tool, there is inconvenience that the handwriting input by the other handwriting tool, which is near or overlaps with the handwriting, is deleted together.

Accordingly, for an electronic device in which it is possible to input a handwriting, there is a need for a method of editing a handwriting according to a handwriting tool used to input the handwriting.

SUMMARY

An aspect of the exemplary embodiment has been made to address the problems described above and to provide an electronic device capable of editing an input handwriting conveniently and a method for controlling the electronic device.

According to an exemplary embodiment, there is provided an electronic device including a display configured to receive a handwriting by touch and display the received handwriting, and a processor configured to display a handwriting input by at least two handwriting tools selected among different handwriting tools provided through the display by dividing layers of the handwriting according to a handwriting tool, and in response to a selection of a layer among the layers divided according to the handwriting tool, control to edit only a handwriting input by a handwriting tool corresponding to the selected layer.

The processor may display a menu indicating the handwriting tool used for the input handwriting, and in response to a selection of a handwriting tooling the displayed menu, select a layer corresponding to the selected handwriting tool.

The processor, in response to a selection of a part of an area in which the handwriting is input, may determine a handwriting tool corresponding to the handwriting input in the selected part, and select a layer corresponding to the determined handwriting tool.

The processor, in response to an eraser tool being executed after one layer among the layers divided according to the handwriting tools is selected, may delete only a handwriting input by a handwriting tool corresponding to the selected layer according to a manipulation by the eraser tool.

The processor, in response to a selection of a layer among the layers divided according to the handwriting tool, may move a handwriting input by a handwriting tool corresponding to the selected layer according to a manipulation by a touch input.

The processor may display the layers divided according to the handwriting tool by dividing as subordinate layers according to a color of the input handwriting, and in response to a selection of a subordinate layer among the subordinate layers divided according to the color of the input handwriting, control to edit only a handwriting input with a color corresponding to the selected subordinate layer.

According to an exemplary embodiment, there is provided a controlling method of an electronic device including dividing layers of a handwriting input by at least two handwriting tools selected among different handwriting tools provided through a display according to a handwriting tool and displaying the handwriting, and in response to a selection of a layer among the layers divided according to the handwriting tool, editing only a handwriting input by a handwriting tool corresponding to the selected layer.

The controlling method of the electronic device may further include displaying a menu indicating the handwriting tools used for the input handwriting, and in response to a selection of a handwriting tool in the displayed menu, selecting a layer corresponding to the selected handwriting tool.

The controlling method of the electronic device may further include in response to a selection of a part of an area in which the handwriting is input, determining a handwriting tool corresponding to the handwriting input in the selected part, and selecting a layer corresponding to the determined handwriting tool.

The editing may include selecting one layer among the layers divided according to the handwriting tool, executing an eraser tool, and deleting only a handwriting input by a handwriting tool corresponding to the selected layer according to a manipulation by the eraser tool.

The editing, in response to a selection of layer among the layers divided according to the handwriting tool, may move a handwriting input by a handwriting tool corresponding to the selected layer according to a manipulation by a touch input.

The displaying may display the layers divided according to the handwriting tool by dividing as subordinate layers according to a color of the input handwriting, and the editing, in response to a selection of a layer among subordinate layers divided according to the color of the input handwriting, may edit only a handwriting input in a color corresponding to the selected subordinate layer.

According to a variety of exemplary embodiments, a handwriting can be edited selectively according to a used handwriting tool, thereby convenience of the user may be improved.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
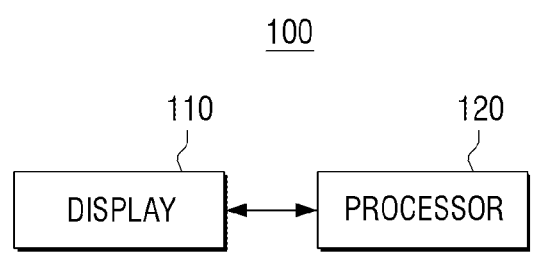
FIG. 1 is a block diagram schematically illustrating a configuration of an electronic device according to an embodiment.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device.

Prior to explaining exemplary embodiments, an explanation will be made on a method by which embodiments of the present disclosure and drawings are disclosed.

First of all, the terms used in the present specification and the claims are general terms selected in consideration of the functions of the various embodiments of the present disclosure. However, these terms may vary depending on intention, legal or technical interpretation, emergence of new technologies, and the like of those skilled in the related art. Further, some of the terms may be ones arbitrarily selected by the applicant. Unless there is a specific definition of a term, the term may be construed based on the overall contents and technological common sense of those skilled in the related art.

Further, like reference numerals indicate like components that perform substantially the same functions throughout the specification. For the sake of explanation and understanding, different embodiments are described with reference to like reference numerals. That is, even if all the components in the plurality of drawings have like reference numerals, it does not mean that the plurality of drawings refers to only one embodiment.

Further, the terms including numerical expressions such as a first, a second, and the like may be used to explain various components, but there is no limitation thereto. These terms are used only for the purpose of differentiating one component from another, without limitation thereto. For example, a numerical expression combined with a component should not limit the order of use or order of arrangement of the component. When necessary, the numerical expressions may be exchanged between components.

The singular expression also includes the plural meaning as long as it does not differently mean in the context. In this specification, terms such as 'include' and 'have/has' should be construed as designating that there are such characteristics, numbers, operations, elements, components or a combination thereof in the specification, not to exclude the existence or possibility of adding one or more of other characteristics, numbers, operations, elements, components or a combination thereof.

In the embodiments of the present disclosure, terms such as "module", "unit", "part", and the like are terms used to indicate components that perform at least one function and operation, and these components may be realized in hardware, software or in combination thereof. Further, except for when each of a plurality of "modules", "units", "parts", and the like needs to be realized in an individual hardware, the components may be integrated in at least one module or chip and be realized in at least one processor (not illustrated).

Further, in embodiments of the present disclosure, when it is described that a portion is connected to another portion, the portion may be either connected directly to the other portion, or connected indirectly via another medium. Further, when it is described that a portion includes another component, it does not exclude the possibility of including other components, that is, the portion may further include other components besides the described component.

Hereinafter, embodiments of the present disclosure will be explained with reference to the drawings.

FIG. 1 is a block diagram schematically illustrating a configuration of an electronic device according to an embodiment.

As illustrated in FIG. 1, the electronic device 100 according to an exemplary embodiment includes a display 110 and a processor 120.

The electronic device 100 may be implemented as a smart phone, a cell phone, a Portable Multimedia Player (PMP), a MP3 player, a tablet PC, and a personal navigation apparatus and the like, which include a touch display in which a handwriting can be input by touch input of a user.

In the exemplary embodiments, the electronic device 100 is implemented only as a smart phone, but the exemplary embodiments are not limited thereto. The electronic device 100 may be implemented as a variety of apparatuses mounting a touch screen including the above mentioned apparatuses.

The display 110 may receive a handwriting by touch through a finger or a touch pen and display the input handwriting. Specifically, the display 110 may be implemented as a display panel (not illustrated) performing a function of displaying information output from the electronic device 100, and a touch display which is composed of an input sense panel (not illustrated) performing an input function corresponding to touch by a user.

Here, the display panel may be composed of Liquid Crystal Display (LCD) or Organic Light Emitting Diodes (OLED) and the like, and may be realized by being structurally integrated with the input sense panel. The display panel may display a variety of screens such as all sorts of states of movement, states of menu, states of executing an application, services, and the like including a handwriting screen of the electronic device 100.

Input sense panel may sense all sorts of inputs such as a single or multi touch input, a drag input, a handwriting input, and a drawing input by a user using all sorts of objects such as a finger and an electronic pen. The input sense panel may be realized by using one panel in which both finger inputs and pen inputs can be sensed, or using two panels such as a touch panel in which a finger input can be sensed and a pen recognition panel in which a pen input can be sensed.

The processor 120 controls an overall operation of the electronic device 100. Especially, the processor 120 may provide an area in which a handwriting by touch can be input and a handwriting tool through the display 110. Here, the handwriting tool is a virtual tool capable of inputting a handwriting which may include a variety of handwriting tools such as a pencil, a ballpoint pen, a brush, a highlighter, and the like. If a handwriting is input by a selected handwriting tool, the processor 120 may control a handwriting effect corresponding to the selected handwriting tool to be displayed on the input handwriting. In addition, the handwriting tool may include a figure drawing tool, a text input tool, and the like.

The processor 120 may display a menu window in which one handwriting tool among a plurality of different handwriting tools can be selected, and if one handwriting tool in the menu window is selected, control to input a handwriting by the selected handwriting tool. Here, the processor 120 may manage a handwriting input by the selected handwriting tool as one layer. Here, if another handwriting tool is selected on a single screen provided through the display 110 and a handwriting is input by the selected handwriting tool, the processor 120 may generate a layer additionally and manage the handwriting input by another handwriting tool on the additionally generated layer. That is, if at least two handwriting tools are selected among different handwriting tools and a handwriting is input by the selected tools, the processor 120 may constitute a handwriting input screen by dividing layers according to the selected handwriting tools.

Here, on the display 110, one handwriting screen in which a plurality of layers overlap is displayed.

If one layer is selected among the layers divided according to the handwriting tools, the selected layer is activated to be in an editable state, and the processor 120 may edit only a handwriting input by a handwriting tool corresponding to the selected layer according to a manipulation of a user.

This will be explained in more detail below with reference to FIGS. 2 and 8.

Figure 2:
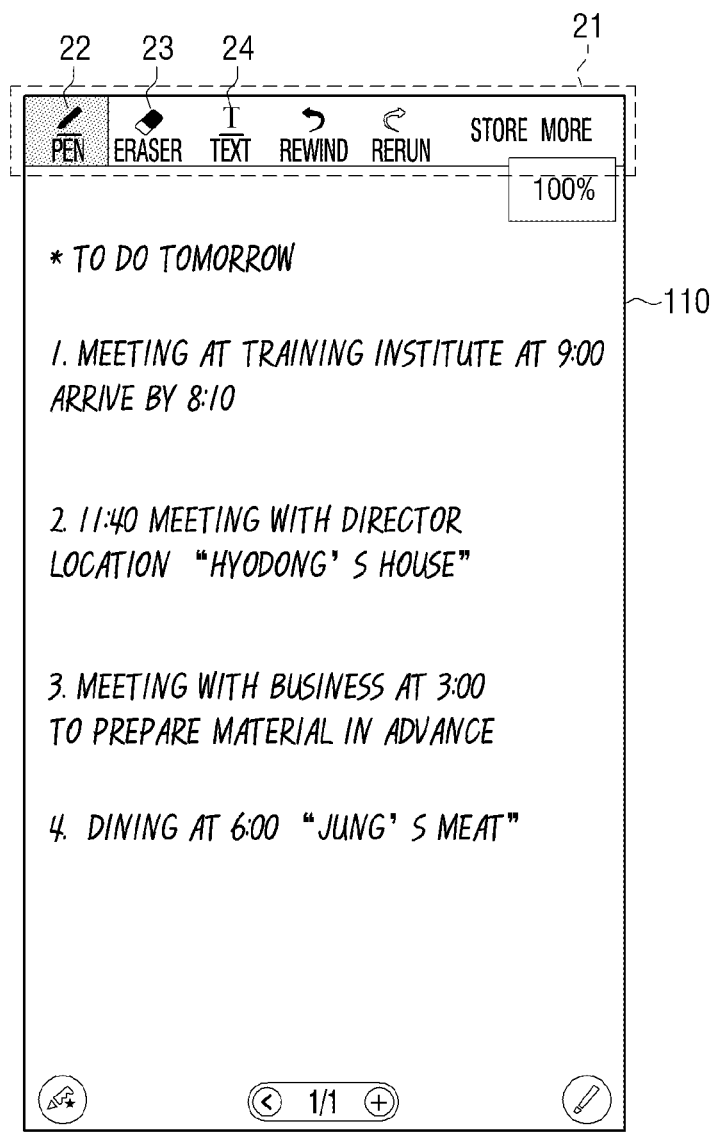
FIG. 2 is a view illustrating a handwriting screen provided in an electronic device according to an exemplary embodiment.

FIG. 2 is a view to explain a handwriting screen provided by an electronic device according to an exemplary embodiment.

As illustrated in FIG. 2, the electronic device 100 input a handwriting through the display 110 and provide a handwriting screen in which the input handwriting can be displayed. Here, the handwriting screen may be provided as an application including a handwriting function installed in the electronic device 100 is executed. The handwriting screen may be composed of a handwriting area and a menu bar 21 located at a top of the handwriting area. The menu bar 21 may set a handwriting method input to the handwriting area, or include a function of editing a handwriting.

If a user selects a pen menu 22 in the menu bar 21, the processor 120 may display a subordinate menu for selecting a sort of handwriting tool, and if a user selects an eraser menu 23, the processor 120 may display a subordinate menu for deleting a part of or an entire input handwriting. If a user selects a text menu 24, the processor 120 may convert a handwriting input mode into a text input mode so a typing input can be performed on a handwriting area. If a mode is converted into the text input mode, the processor 120 may display a text cursor to input a text.

Figure 3:
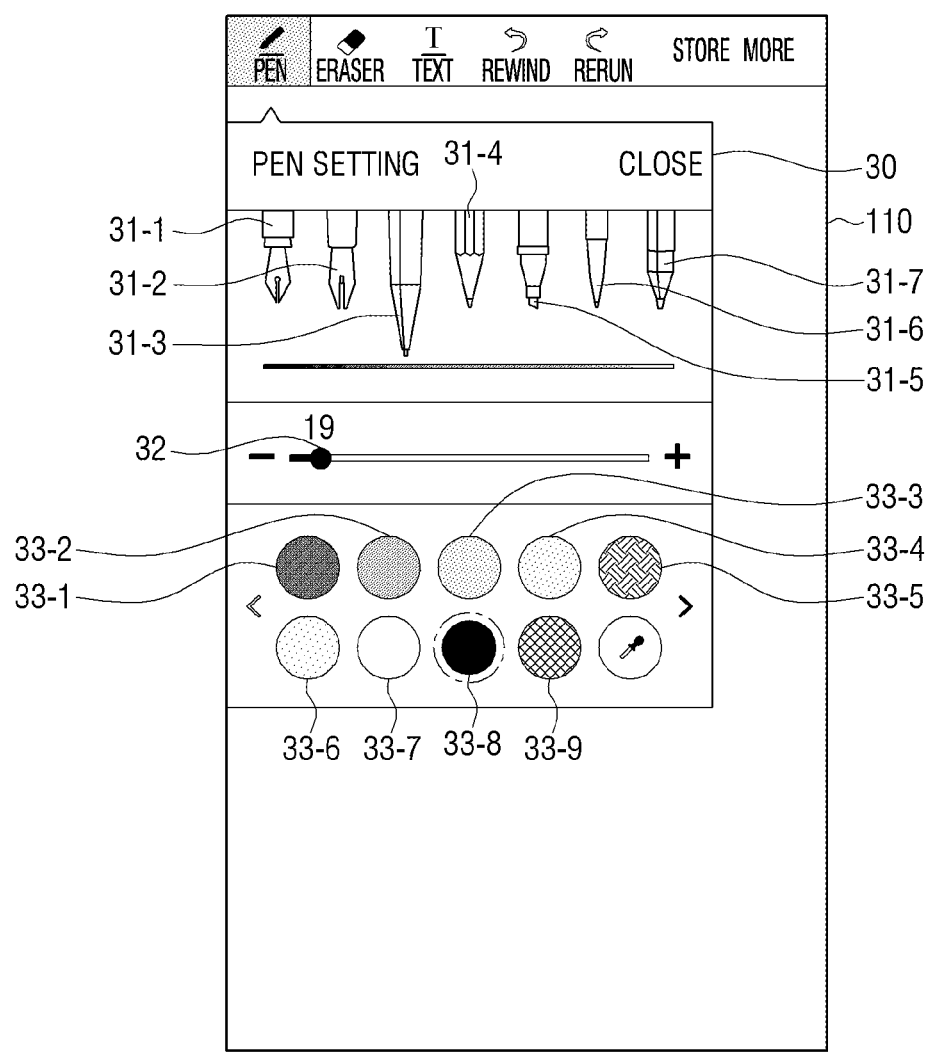
FIG. 3 is a view illustrating a handwriting tool selection menu provided in a handwriting screen according to an exemplary embodiment.

FIG. 3 is a view illustrating a handwriting tool selection menu provided in a handwriting screen according to an exemplary embodiment.

If a user selects the pen menu 22 in the menu bar 21, the processor 120 may display a subordinate menu 30 including a sort selection area in which a user can select a sort of handwriting tool, a thickness adjusting area in which a user can select a thickness of a handwriting tool, and a color selection area in which a user can select a color of a handwriting tool.

If a handwriting is input by a handwriting tool selected among a plurality of handwriting tools (31-1~13-7) displayed on the sort selection area, the processor 120 may generate a layer corresponding to the handwriting tool used to input the handwriting, and control to input only a handwriting input by the corresponding handwriting tool on the generated layer.

As a user manipulates a thickness adjusting bar 32 in the thickness adjusting area, the processor 120 may adjust a thickness of a handwriting input by a selected handwriting tool, and if one color among a plurality of colors (33-1~33-9) displayed on the color selection area is selected, the processor 120 may set the selected color as a color of a handwriting input by the selected handwriting tool.

Figure 4:
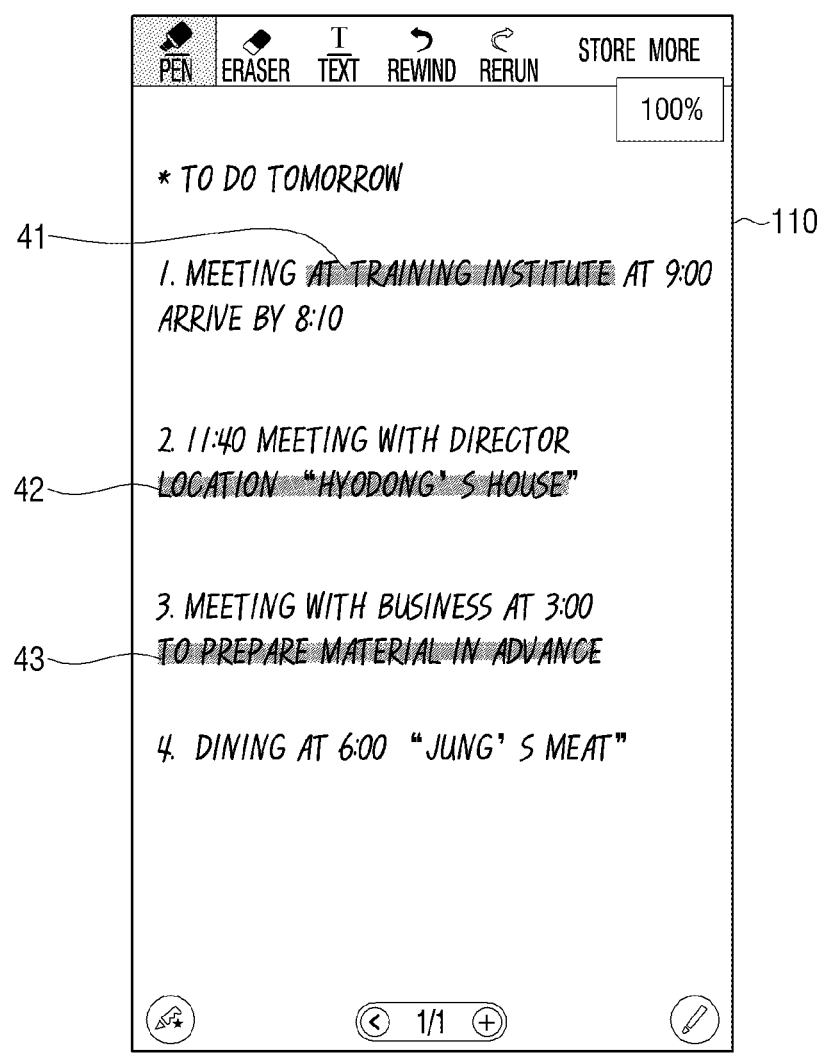
FIG. 4 is a view illustrating a screen in which a handwriting is input by different handwriting tools according to an exemplary embodiment.

FIG. 4 is a view illustrating a screen in which a handwriting is input by different handwriting tools according to an exemplary embodiment.

After selecting a first handwriting tool among a plurality of handwriting tools and inputting a handwriting, a user may select a second handwriting tool which is a different kind of tool from the first handwriting tool and input a handwriting by the second handwriting tool in the same area where a handwriting by the first handwriting tool is input. According to a conventional art, there is a problem that because a handwriting input by the first handwriting tool and a handwriting input by the second handwriting tool overlap, when a user tries to edit only a handwriting input by the first handwriting tool or only a handwriting input by the second handwriting tool, it is difficult to edit the handwritings separately. For example, if a user performs an operation of deleting a part of a handwriting input by the first handwriting tool by using an eraser tool, a handwriting overlaps the corresponding part or a handwriting input by the second handwriting tool near the corresponding part may be also deleted by the eraser tool, and thus it is inconvenient for a user to erase only a part where the user wants to delete. However, if a handwriting is displayed by dividing a layer according to a handwriting tool, only a layer selected by a user is activated to be in an editable status, and thus the problem of inconvenience may be solved.

For example, as illustrated in FIG. 4, after selecting a pencil among a plurality of handwriting tools and inputting a handwriting, a user may highlight an important part among an input handwriting by using a highlighter. Here, the user may highlight parts 41, 42 and 43 where the user wants to highlight among a handwriting input by a pencil, by selecting a highlighter among a plurality of handwriting tools.

Here, the processor 120 may display the handwriting input by a pencil and the handwriting input by a highlighter by dividing the handwritings on different layers, and the handwritings input on a handwriting area may be edited separately for each layer.

Figure 5:
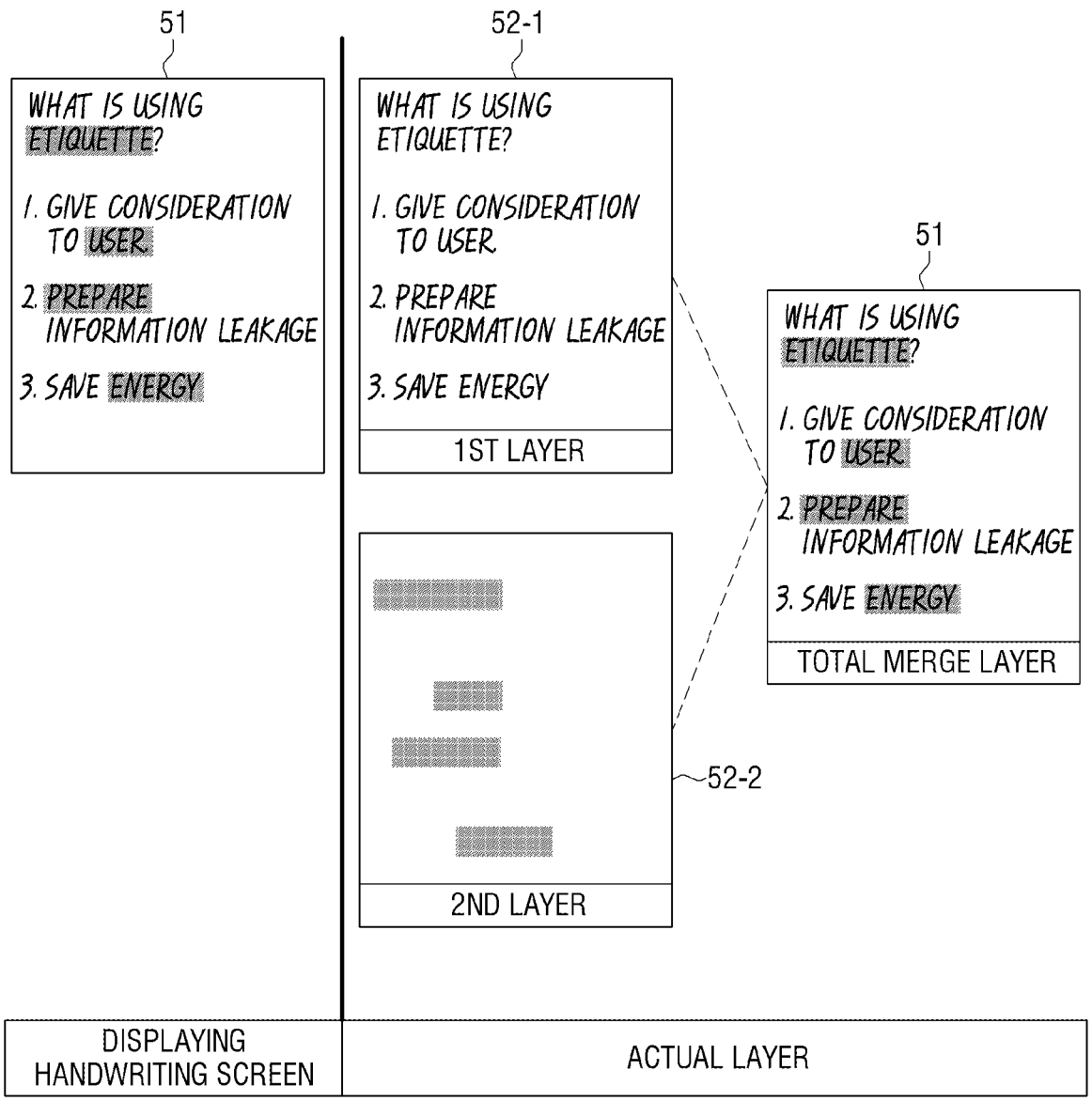
FIG. 5 is a view illustrating a layer divided according to a handwriting tool according to an exemplary embodiment.

As an exemplary embodiment illustrated in FIG. 5, a handwriting screen 51 in which 'etiquette', 'user', 'prevention' and 'energy' among a handwriting input by a first handwriting tool are highlighted by a second handwriting tool may be divided into a first layer 52-1 which only includes a handwriting input by the first handwriting tool and a second layer 52-2 which only includes a highlight that is a handwriting input by the second handwriting tool. Here, a screen in which the first layer 52-1 and the second layer 52-2 overlap is shown to a user.

Figure 6:
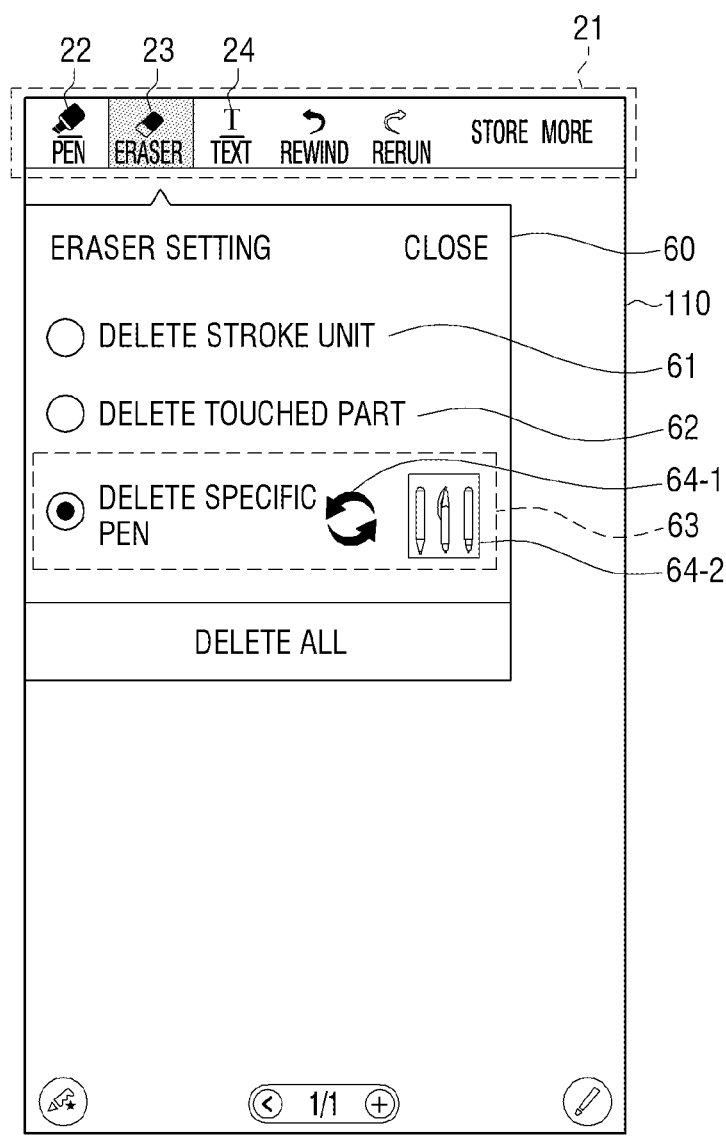
FIGS. 6, 7 and 8 are views illustrating a process of editing a screen input by a specific handwriting tool according to an exemplary embodiment.
Figure 7:
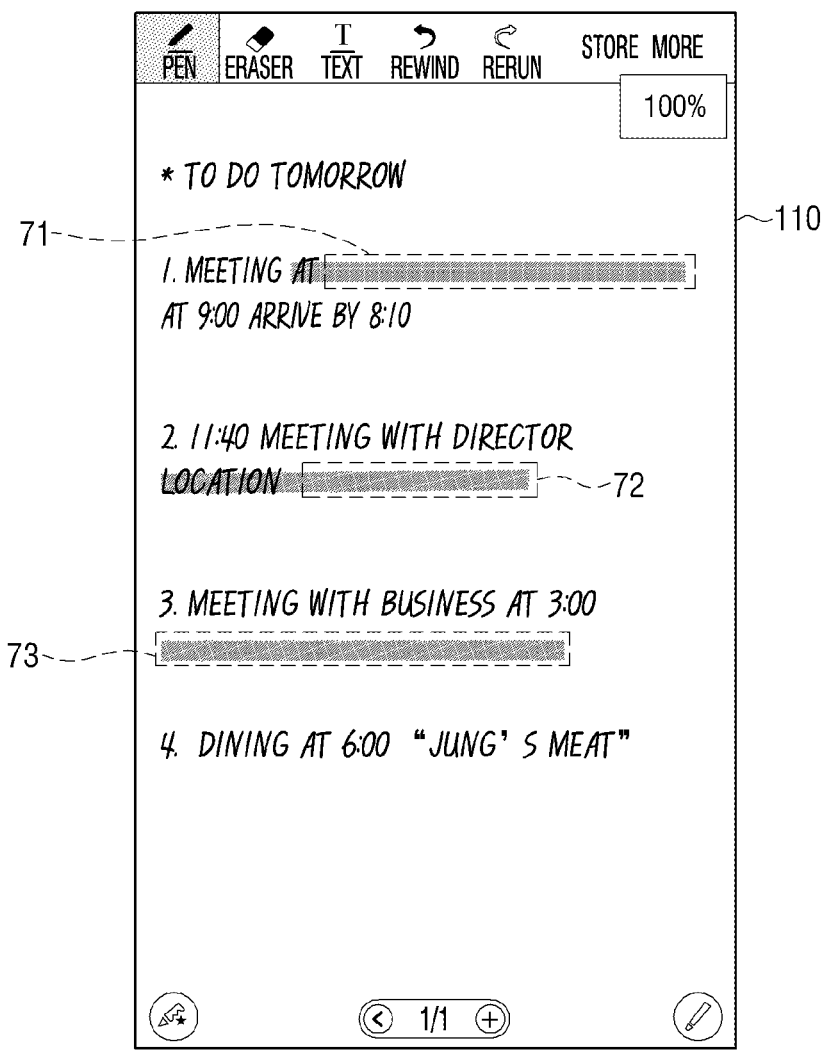
Figure 8:
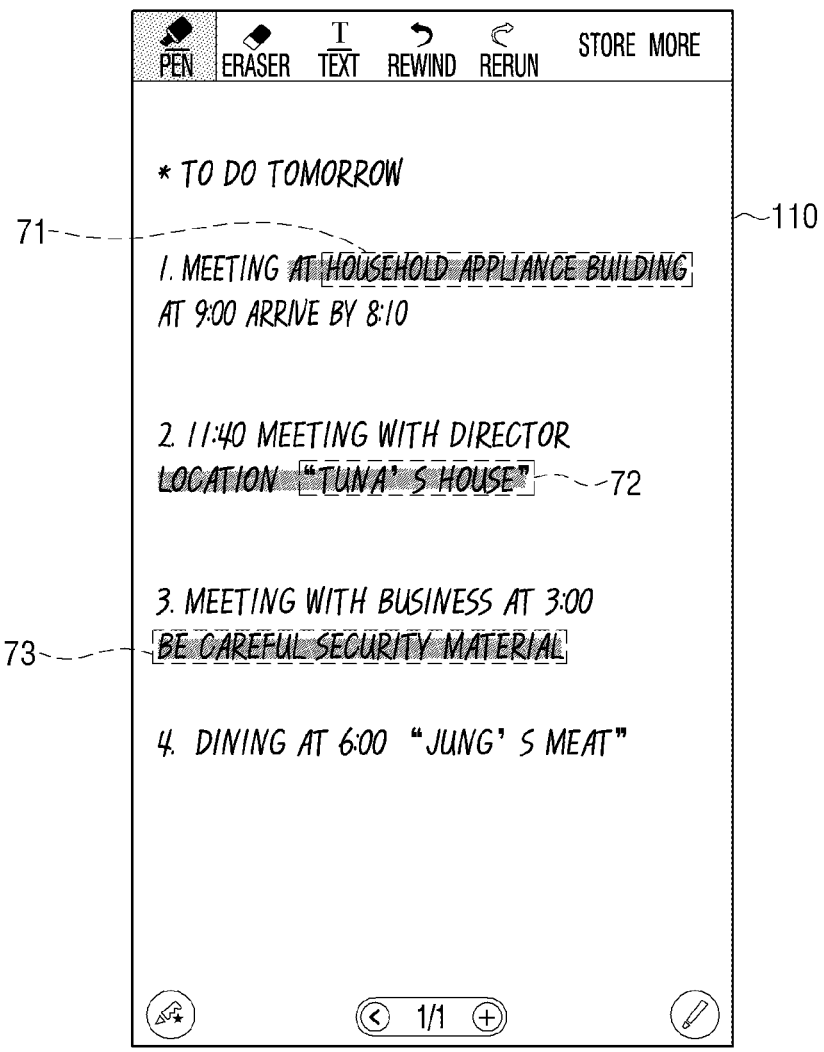

FIGS. 6, 7 and 8 are views illustrating a process of editing a screen input by a specific handwriting tool according to an exemplary embodiment.

As illustrated in FIG. 6, if an eraser menu 23 in the menu bar 21 at a top of a handwriting screen is selected, the processor 120 may control to display a subordinate menu 60 in which a method to delete an input handwriting can be selected. In the subordinate menu 60, a radio button may be displayed, in which a deleting method such as deleting by a stroke 61, deleting a touched area 62, deleting a specific pen 63 and the like can be selected. The processor 120 may display handwriting tools used to input a handwriting, as a thumbnail image 64-2, on an area 62 in which the deleting a specific pen 63 can be selected, and if a user touches a conversion icon 64-1, the processor 120 may select a specific handwriting tool on the thumbnail image 64-2 rotationally. A layer corresponding to the specific handwriting tool selected according to the above mentioned method is chosen as a layer to be edited.

After one layer among layers divided according to a handwriting tool used to input a handwriting is selected first, the processor 120 may control to delete only a handwriting input by a handwriting tool corresponding to the selected layer by a manipulation of the eraser tool as an eraser tool is executed in the menu bar 21.

A menu indicating a handwriting tool used for an input handwriting may be displayed separately. If a user selects the deleting a specific pen 63, the processor 120 may display a menu indicating the handwriting tool used for the input handwriting separately, and if one handwriting tool is selected in the separately displayed menu, a layer corresponding to the selected handwriting tool may be selected.

For an another exemplary embodiment, if a part of an area in which a handwriting is input is selected, the processor 120 may determine a handwriting tool corresponding to the handwriting input in the selected part, and select a layer corresponding to the determined handwriting tool. Specifically, if a user touches an area in which a handwriting is input, the processor 120 may determine a handwriting tool used to input a handwriting corresponding to the touched area, and activate a layer corresponding to the determined handwriting tool to be in an editable status. However, if an area in which handwritings input by different handwriting tools overlap is selected, the processor 120 may display a menu for selecting one of the handwriting tools corresponding to the handwritings input on the overlapped area.

FIG. 7 illustrates that a layer corresponding to a first handwriting tool is selected on a handwriting input screen illustrated in FIG. 4, and a part of an input handwriting is deleted on the selected layer. Specifically, when a layer corresponding to the first handwriting tool is activated, a user may delete some items such as 'at a training institute', 'Hyodong's house' and 'to prepare material in advance' among a handwriting input by the first handwriting tool with an eraser tool. Accordingly, deleted areas 71, 72 and 73 may be displayed as a blank as illustrated in FIG. 7.

As illustrated in FIG. 8, a user may substitute the deleted handwriting to other contents by writing changed contents such as 'at a household appliances building', 'Tuna's house', and 'to be careful security material' on the areas 71, 72 and 73 which are displayed as a blank.

In the above-described exemplary embodiments, an operation to delete an input handwriting according to a handwriting tool has been described. However, all editings including applying effect such as deleting, moving, copying, cutting, coloring, decorating and the like may be possible for each handwriting tool.

For example, the processor 120 may control to move a handwriting input by a handwriting tool corresponding to a selected layer on a screen according to an operation by a touch input. A handwriting area which moves at this time may be an entire or a part of a handwriting area included in a selected layer.

The processor 120 may display layers divided according to a handwriting tool by dividing into subordinate layers according to a color of an input handwriting, and in response to one subordinate layer among the subordinate layers divided according to the color of the input handwriting being selected, control to edit only a handwriting input by a color corresponding to the selected subordinate layer. For example, handwritings having different colors are input, even if the handwritings are written by the same handwriting tool, the processor 120 may generate a subordinate layer of a layer corresponding to the corresponding handwriting tool by a color, and divide the input handwriting into different subordinate layers by a color. Accordingly, if a user tries to edit only a handwriting input by a specific color, a user may select a subordinate layer corresponding to the specific color and edit only the handwriting input by the color. Here, the processor 120 may display a menu for selecting one of the colors used for the input handwriting, and if one color is selected in the displayed menu, the processor 120 may activate only a layer corresponding to the selected color and change the layer to be in an editable status.

Figure 9:
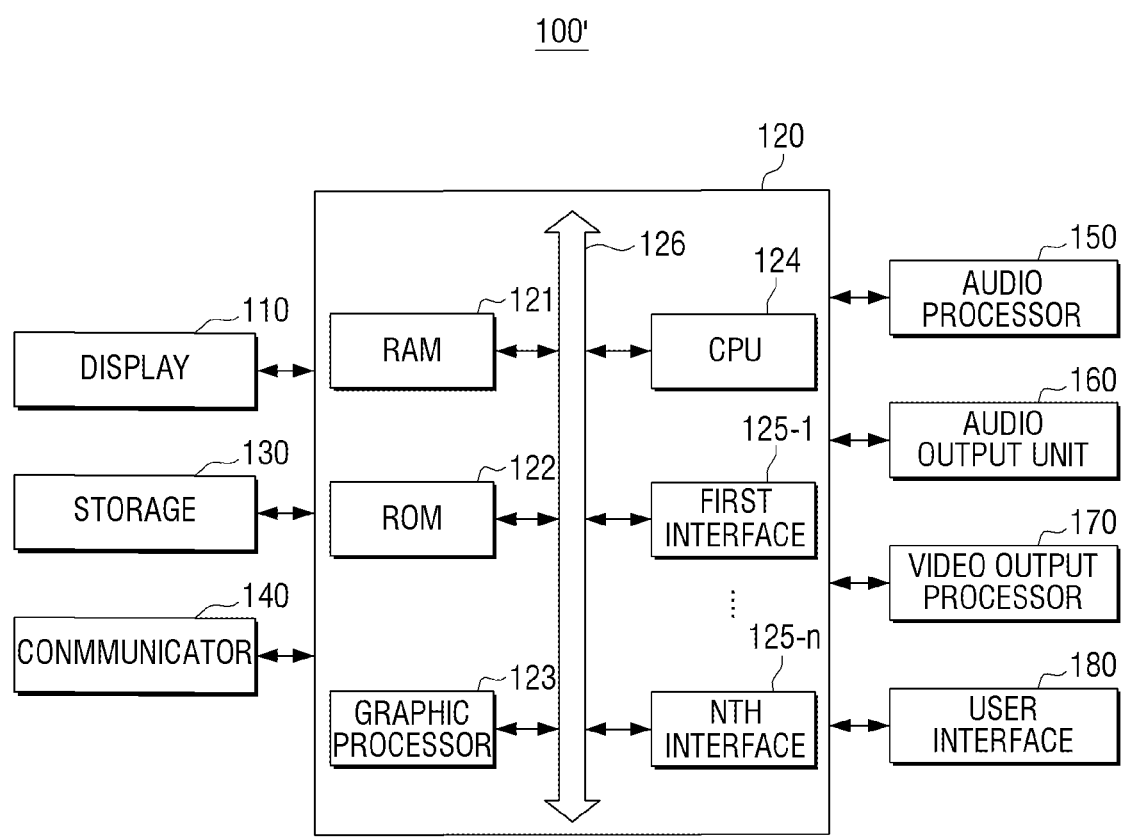
FIG. 9 is a block diagram illustrating a detailed configuration of an electronic device according to another exemplary embodiment.

FIG. 9 is a block diagram illustrating a detailed configuration of an electronic device according to another exemplary embodiment.

As illustrated in FIG. 9, the electronic device 100' according to another exemplary embodiment may include a display 110, the processor 120, a storage 130, a communicator 140, an audio processor 150, an audio output unit 160, a video processor 170 and a user interface unit 180. Hereinafter, explanation of the duplicate configuration as illustrated in FIG. 1 will be omitted.

The storage 130 may store a variety of modules to operate the electronic device 100'.

Specifically, the storage 130 may further store a base module which processes a signal transmitted from each hardware included in the electronic device 100', a storage module which manages a database or a registry, a security module, a communication module and the like.

The communicator 140 is an element which performs communication with an external device according to various types of communication methods. The communicator 140 may include a WiFi chip, a Bluetooth chip, a wireless communication chip and the like, and perform a communication with another electronic device including a server.

The audio processor 150 is an element which performs processing on audio data.

The audio output unit 160 is an element which outputs audio data processed in the audio processor 150.

The video processor 170 is an element which performs various image processings such as decoding, scaling, noise filtering, frame rate converting, resolution converting and the like on an input image.

The user interface 180 is an element to detect a user interaction to control an overall operation of the electronic device 100'. Especially, the user interface 180 may include various interaction sensing apparatuses such as a camera (not illustrated), a microphone (not illustrated) and the like.

The processor 120 may control an overall operation of the electronic device 100' by using all sorts of modules stored in the storage 130.

As illustrated in FIG. 9, the processor 120 includes a Random Access Memory (RAM) 121, a Read Only Memory (ROM) 122, a graphic processor 123, a CPU 124, first to nth interfaces 125-1 to 125-n, and a bus 126. Here, the RAM 121, the ROM 122, the graphic processor 123, the CPU 124, and the first to nth interfaces 125-1 to 125-n may be connected with one another via the bus 126.

The ROM 122 stores a command set, etc., for booting a system. The CPU 124 copies various application programs stored in the storage 130 into the RAM 121, and performs various operations by executing the application programs copied into the RAM 121.

The graphic processor 123 generates a screen including various types of objects such as an icon, an image, a text, etc., by using an operator (not illustrated) and a renderer (not illustrated). The operator calculates attribute values, such as coordinate values, shapes, sizes, colors, etc., at which the objects are to be respectively displayed according to a layout of the screen. The renderer generates a screen of various layouts including objects based on the attribute values that are operated by the operator.

The CPU 124 accesses the storage 130 and performs booting using an O/S stored in the storage 130. In addition, the CPU 124 performs various operations using various programs, contents, and data stored in the storage 130.

The first to the nth interfaces (125-1 to 125-n) are connected to the above-described various elements. One of the interfaces may be a network interface connected to an external apparatus via network.

Figure 10:
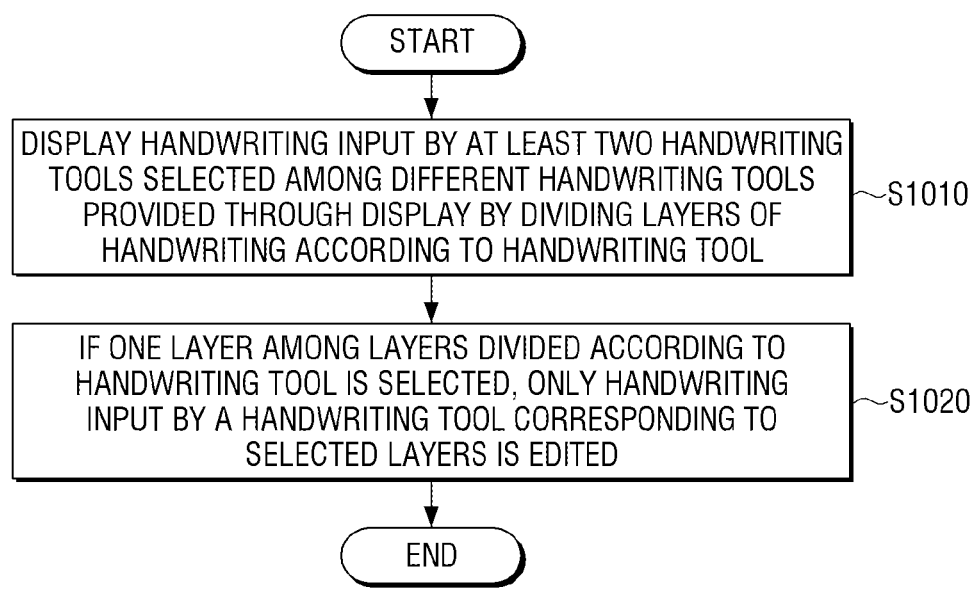
FIG. 10 is a flowchart illustrating a method of controlling an electronic device according to an exemplary embodiment.

FIG. 10 is a flowchart illustrating a method of controlling an electronic device according to an exemplary embodiment.

First, display a handwriting input by at least two handwriting tools selected among different handwriting tools provided through the display by dividing layers of the handwriting according to a handwriting tool S1010.

Here, a menu indicating the handwriting tool used for the input handwriting can be displayed, and if one handwriting tool is selected in the displayed menu, a layer corresponding to the selected handwriting tool can be selected.

As another exemplary embodiment, if a part of an area in which the handwriting is input is selected, a handwriting tool corresponding to the handwriting input in the selected part is determined, and a layer corresponding to the determined handwriting tool can be selected.

After then, if one layer among the layers divided according to the handwriting tool is selected, only a handwriting input by a handwriting tool corresponding to the selected layer is edited S1020.

Here, if an eraser tool is executed according to a user command after one layer among the layers divided according to the handwriting tools is selected, only a handwriting input by a handwriting tool corresponding to the selected layer can be deleted according to a manipulation by the eraser tool. In addition, if one layer is selected among the layers divided according to the handwriting tool, a handwriting input by a handwriting tool corresponding to the selected layer can be moved according to a manipulation by a touch input.

According to various exemplary embodiments as in the above, a handwriting may be selectively edited according to a handwriting tool or a color, and thus a user may edit only a handwriting that the user wants to edit easily.

The controlling method of an electronic device 100 according to the above-described various embodiments may be implemented as a program and stored in various recording mediums. That is, a computer program that has been processed by various processors and therefore has become capable of executing the aforementioned control methods may be stored in a non-transitory recording medium and be used.

For example, a non-transitory computer readable medium may be provided, which stores a program performing displaying a handwriting input by at least two handwriting tools selected among different handwriting tools provided through the display by dividing layers of the handwriting according to a handwriting tool, and if one layer among the layers divided according to the handwriting tool is selected, editing only a handwriting input by a handwriting tool corresponding to the selected layer.

The non-transitory computer readable medium is not a medium that stores data temporarily, such as a register, a cache, and a memory, but means medium that semi-permanently stores data and is readable by a device. Specifically, the above-described various applications or programs may be stored in a non-temporal recordable medium such as Compact Disk (CD), DVD, hard disk, Blu-ray disk, Universal Serial Bus (USB), memory card, ROM, and the like, and provided therein.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
a display configured to provide different writing tools; and
a processor configured to:
in response to a first writing tool being selected from the different writing tools and a first touch input being received, control the display to provide a first layer corresponding to the first writing tool and to display a first writing corresponding to the first touch input on the first layer,
in response to a second writing tool being selected from the different writing tools and a second touch input being received, control the display to provide a second layer corresponding to the second writing tool and to display a second writing corresponding to the second touch input on the second layer, the second layer overlapped the first layer, and
in response to a selection of a layer among the first layer and the second layer, control to edit a writing corresponding to the selected layer among the first writing and the second writing,
wherein the processor is further configured to, in response to the first writing tool being selected from the different writing tools and a third touch input being received, control the display to display a third writing corresponding to the third touch input with the first writing on the first layer.

2. The electronic device as claimed in claim 1, wherein the processor is further configured to:
display a menu indicating the writing tools used for the first writing and the second writing, and
in response to a selection of a writing tool in the displayed menu, select a layer corresponding to the selected writing tool.

3. The electronic device as claimed in claim 1, wherein the processor is further configured to:
in response to a selection of a part of an area in which the first writing and the second writing are displayed, determine a writing tool corresponding to a writing among the first writing and the second writing in the selected part, and selects a layer corresponding to the determined writing tool.

4. The electronic device as claimed in claim 1, wherein the processor is further configured to:
in response to an eraser tool being executed after one layer among the first layer and the second layer is selected, delete a writing by a writing tool corresponding to the selected layer according to a manipulation by the eraser tool.

5. The electronic device as claimed in claim 1, wherein the processor is further configured to:
in response to a selection of a layer among the first layer and the second layer, move the writing corresponding to the selected layer according to a manipulation by a touch input.

6. The electronic device as claimed in claim 1, wherein the processor is further configured to:
display first layer and the second layer by dividing as subordinate layers according to color of the first writing and the second writing, and
in response to a selection of a subordinate layer among the subordinate layers divided according to the color of the first writing and the second writing, control to edit a writing with a color corresponding to the selected subordinate layer.

7. A controlling method of an electronic device comprising:
in response to a first writing tool being selected from the different writing tools and a first touch input being received, providing a first layer corresponding to the first writing tool and displaying a first writing corresponding to the first touch input on the first layer;
in response to a second writing tool being selected from the different writing tools and a second touch input being received, providing a second layer corresponding to the second writing tool and displaying a second writing corresponding to the second touch input on the second layer, the second layer overlapped the first layer;
in response to the first writing tool being selected from the different writing tools and a third touch input being received, displaying a third writing corresponding to the third touch input with the first writing on the first layer; and
in response to a selection of a layer among the first layer and the second layer, editing only a writing corresponding to the selected layer among the first writing and the second writing.

8. The controlling method as claimed in claim 7, further comprising:
displaying a menu indicating the writing tools used for the first writing and the second writing; and
in response to a selection of a writing tool in the displayed menu, selecting a layer corresponding to the selected writing tool.

9. The controlling method as claimed in claim 7, further comprising:
in response to a selection of a part of an area in which the first writing and the second writing are displayed, determining a writing tool corresponding to a writing among first writing and the second writing in the selected part; and
selecting a layer corresponding to the determined writing tool.

10. The controlling method as claimed in claim 7, wherein the editing comprising:
selecting one layer among the first layer and the second layer;
executing an eraser tool; and
deleting a writing input by a writing tool corresponding to the selected layer according to a manipulation by the eraser tool.

11. The controlling method as claimed in claim 7, wherein the editing, in response to a selection of a layer among the first layer and the second layer, moves the writing corresponding to the selected layer according to a manipulation by a touch input.

12. The controlling method as claimed in claim 7, wherein the displaying displays the first layer and the second layer by dividing as subordinate layers according to colors of the first writing and the second writing,
wherein the editing, in response to a selection of a layer among subordinate layers divided according to the color of the first writing and the second writing, edits a writing in a color corresponding to the selected subordinate layer.

13. A non-transitory computer readable storage medium having instructions stored therein, comprising a plurality of instructions configured to, when executed by a processor of an electronic device, cause the processor to:

in response to a first writing tool being selected from the different writing tools and a first touch input being received, provide a first layer corresponding to the first writing tool and display a first writing corresponding to the first touch input on the first layer, in response to a second writing tool being selected from the different writing tools and a second touch input being received, provide a second layer corresponding to the second writing tool and display a second writing corresponding to the second touch input on the second layer, the second layer overlapped the first layer, and in response to a selection of a layer among the first layer and the second, control to edit a writing corresponding to the selected layer among the first writing and the second writing, wherein the plurality of instructions is further configured to, in response to the first writing tool being selected from the different writing tools and a third touch input being received, cause the processor to display a third writing corresponding to the third touch input with the first writing on the first layer.

14. The non-transitory computer readable storage medium as claimed in claim 13, wherein the plurality of instructions are further configured to cause the processor to:

display a menu indicating the writing tools used for the first writing and the second writing, and in response to a selection of a writing tool in the displayed menu, select a layer corresponding to the selected writing tool.

15. The non-transitory computer readable storage medium as claimed in claim 13, wherein the plurality of instructions are further configured to cause the processor to:

in response to a selection of a part of an area in which the first writing and the second writing are displayed, determine a writing tool corresponding to input a writing among the first writing and the second writing in the selected part, and selects a layer corresponding to the determined writing tool.

16. The non-transitory computer readable storage medium as claimed in claim 13, wherein the plurality of instructions are further configured to cause the processor to:

in response to an eraser tool being executed after one layer among the first layer and the second layer is selected, delete a writing by a writing tool corresponding to the selected layer according to a manipulation by the eraser tool.

17. The non-transitory computer readable storage medium as claimed in claim 13, wherein the plurality of instructions are further configured to cause the processor to: in response to a selection of a layer among the first layer and the second layer, move the writing corresponding to the selected layer according to a manipulation by a touch input.

18. The non-transitory computer readable storage medium as claimed in claim 13, wherein the plurality of instructions are further configured to cause the processor to:

display the first layer and the second layer by dividing as subordinate layers according to color of the first writing and the second writing, and in response to a selection of a subordinate layer among the ordinate layers divided according to the color of the first writing and the second writing, control to edit a writing with a color corresponding to the selected subordinate layer.

\* \* \* \* \*